Dec. 18, 1956  H. A. MATZ  2,774,169
WEEDLESS LIVE BAIT FISHING PLUG
Filed Dec. 2, 1954
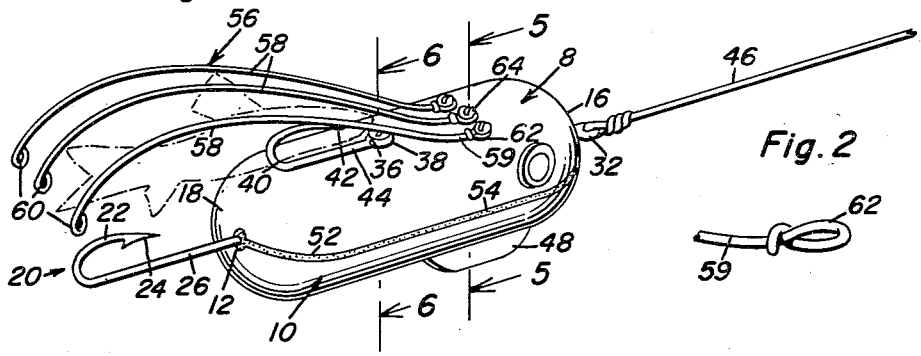
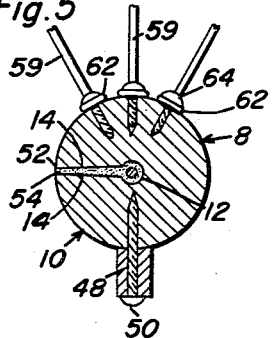
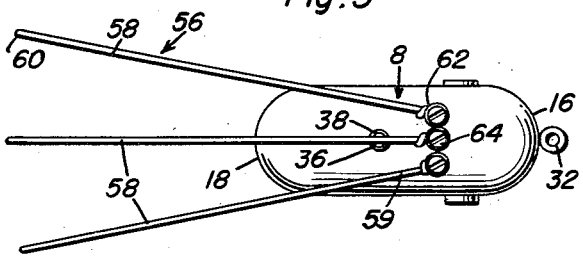
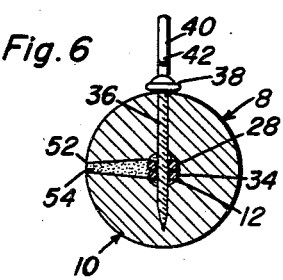
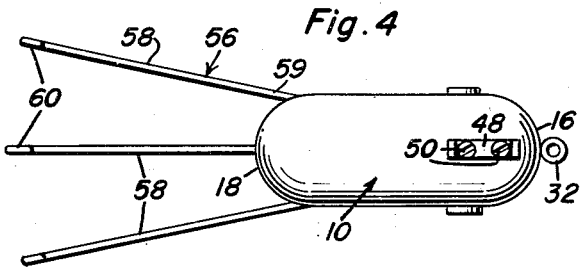
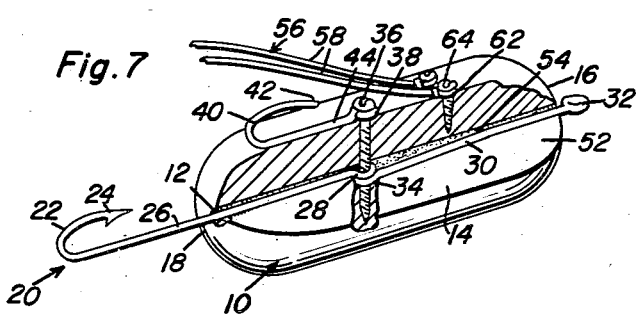
Herman A. Matz
INVENTOR.

United States Patent Office 2,774,169
Patented Dec. 18, 1956

2,774,169

WEEDLESS LIVE BAIT FISHING PLUG

Herman A. Matz, Perham, Minn.

Application December 2, 1954, Serial No. 472,630

4 Claims. (Cl. 43—41)

The present invention relates to certain new and useful improvements in a structurally novel and distinct fishing device and has reference in particular to one which is characterized by a wooden or equivalent lightweight and buoyant plug having means thereon for satisfactorily attaching and retaining a live minnow, said means being thought to be structurally unique and aptly suited to better fulfill the requirements of fishermen.

It will be evident that an object of the invention is to structurally and functionally improve upon similarly constructed and performing weedless plug-type fishing devices. To this end, the plug itself is believed to be structurally distinct in that it is slotted lengthwise to thus provide a construction which lends itself to expeditious manufacturing and assembling and allows shank portions of complemental parts to be readily positioned, assembled and adequately secured between the components of the plug.

More specifically, novelty is predicated upon a slotted plug or body wherein the eye-equipped end of the shank of the fishhook is located between the body components, there being a rod member cooperable therewith and having an eye aligned with the usual eye on the shank of the fishhook, said aligned eyes permitting the passage of a single assembling and fastening screw therethrough and also through, or partly through, the stated components of the plug.

Further, novelty is predicated on the construction covered and wherein the single assembling screw also passes through a third eye, that is, an eye on the end of the shank portion of a bait anchoring hook which latter hook is anchored on the central top side of the plug.

Briefly, the invention has to do with a buoyant plug, a fishhook spaced from the trailing end of the plug and having a rigid shank mounted axially in the plug. A live bait hook, having a rigid shank, is superimposed upon the top of the plug and secured to the central portion of the plug and is coplanar with the fishhook and with the shanks in parallelism. The plug itself is longitudinally slotted and embodies complemental top and bottom portions, each of the stated shanks having an eye and the eyes being aligned with one another and one of the eyes being confined in the slot existing between the top and bottom portions. A single assembling screw is screwed through the top portion and also into the bottom portion and passes through both the eyes to assemble the cooperating parts. The slot is tapered outwardly and has a suitable filler therein. A plurality of flexibly resilient wires have their forward ends removably secured to the plug forwardly of the live bait hook and their rear ends are free and project beyond the trailing end of the plug and overlie the fishhook. The free ends have tight coil return bends providing front terminals to prevent unnecessary injury to a fish in an obvious manner.

Other objects, features and advantages will become more readily apparent from the following description and the accompanying sheet of illustrative drawings.

In the drawings wherein like numerals are employed to designate like parts throughout the views:

Figure 1 is a perspective view of a live bait fishing plug constructed in accordance with the present invention.

Figure 2 is a perspective view of the attachable end of one of the weed deflecting or guard wires.

Figure 3 is a top plan view.

Figure 4 is a bottom plan view.

Figure 5 is a section on the line 5—5 of Figure 1.

Figure 6 is a cross-section taken on the plane of the line 6—6 of Figure 1.

Figure 7 is a perspective view with portions broken away and shown in section.

Referring now to the drawings with the aid of reference numerals, the plug is constructed of any suitable lightweight buoyant stock or material, commercial plastics, wood, or whatever is found to be most satisfactory for efficient and economical manufacturing results. The plug is substantially circular in cross-section as brought out in Figs. 5 and 6. It is made up, as before stated, of a side slotted plug defining top and bottom portions, here referred to as a top component 8 and a bottom component 10. Each component has a lengthwise channel or groove 12 formed in its inward flat surface 14 as brought out in Figs. 5, 6, 7. The forward or leading end of the plug is denoted conveniently by the numeral 16 and the trailing end by the numeral 18. The half-portions or components of the groove 12 provide an axial bore which accommodates the associated complements or accessories in the manner shown in Figs. 6 and 7. It will be noted, for instance, that the fishhook 20 has the usual hooked end 22 with a barbed bill 24. The shank 26 is rigid and it passes through the passage or bore and terminates in an eye 28. There is a rod member 30 which has a line eye 32 at its leading end with the rod portion located in the passage and terminating in an eye 34. These two eyes 34 and 28 are in alignment to accommodate the threaded shank of the single assembling screw 36. This screw also passes through the eye 38 on the rigid shank of the bait hook 40. More specifically, this hook has a barbless bill 42 and a shank portion 44 which rests atop the central portion of the plug and is secured by the screw 36. Thus, the one screw 36 serves to assemble and secure these several eyes 38, 34 and 28 together. In addition, the shank of the screw passes through the upper portion 8 into and substantially through the lower portion 10, all as brought out in Figure 7. The eye 32 serves to accommodate the fishing line 46. A suitable detachable balancing weight is provided as at 48 and this is removably secured by screws or similar separable fastenings 50—50. The idea is to attach this weight to the belly or ventral portion inwardly of the nose or leading end 16. Weights of different sizes may be utilized, as is obvious.

With further reference to the body it will be seen that the upper and lower portions 8 and 10 are defined by splitting or slitting the plug lengthwise as at 52. After the rod 30 and shank of the fishhook are inserted and secured by the fastening 36 the space which would otherwise be left by the bifurcation or slit is filled with an appropriate plastic or filler compound as at 54.

Attention now comes to the assembly of the three weed deflecting and guard wires. These wires are flexibly resilient and are identical and they are conveniently denoted hereby, as a group, by the numeral 56. The individual wires are longitudinally bowed and are denoted at 58 and have their forward shank portions 59 fashioned into eyes 62 anchored or secured in place by wood screws 64. The rearward ends of the wires are in spaced divergent relationship and they terminate in close-coiled return bends 60. These freely flexible and resilient terminal ends or bends overhang the projecting portions of the fishhook and function to fend an attacking fish from accidentally striking the bait hook independently of the fishhook.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A live bait holding and fishing device comprising, in combination, a buoyant plug, a fishhook spaced from the trailing end of said plug and having a rigid shank mounted axially in said plug, a rigid live bait hook having a rigid shank superimposed upon the top of said plug, secured to a central portion of said plug and in parallelism with said first named shank, said plug being longitudinally slotted and embodying complemental top and bottom portions, each of said shanks having an eye and the eyes being aligned with one another and one of said eyes confined in the slot between said top and bottom portions, and a single assembling screw screwed through said top portion and into said bottom portion and also passing through both of said eyes to in this manner assemble the cooperating parts, said slot being tapered outwardly and having a filler therein.

2. The structure defined in claim 1 and the combination therewith of a plurality of flexibly resilient wires having their forward ends removably secured to said plug forwardly of said live bait hook and their rear ends free and projecting beyond the trailing end of said plug and overlying the fishhook, said free ends having tight coiled return bends providing blunt terminals to prevent unnecessary injury to a fish which makes a strike at the bait but is not effectually hooked.

3. A live bait holding and fishing device comprising, in combination, a buoyant plug for attachment to a fishing line, said plug being provided in one side with a lengthwise slot, said slot opening through the respective leading and trailing ends of said plug, said slot serving to define cooperating upper and lower portions having adjacent flat walls defined by said slot and each having a lengthwise groove opening through the respective leading and trailing ends of the plug and defining an axial bore, a fishhook having a hooked end portion projecting beyond the trailing end of said plug and a shank portion located in the rear half portion of said bore and provided with an eye also located in said bore, a rod having a portion confined in the forward half portion of said bore and provided with an eye in alignment with said first-named eye and also provided with a second eye located beyond the leading end of the plug to accommodate a fishing line, a live bait hook having a shank superimposed upon said top portion and also provided with an eye at its forward end, and a screw passing through said last named eye and the first and second named eyes and securing the parts in assembled relationship, said slot being tapered outwardly and having a filler therein.

4. The structure defined in claim 3 and the combination therewith of a plurality of flexibly resilient wires having their forward ends removably secured to said plug forwardly of the attached forward end of said live bait hook and having their rearward ends projecting beyond the trailing end of said plug and substantially overlying not only the live bait hook but also the hooked shank portion of said fishhook and said free ends having tight coiled return bends providing blunt terminals to prevent unnecessary injury to a fish which makes a strike at the bait but is not effectually hooked.

References Cited in the file of this patent
UNITED STATES PATENTS

| | | |
|---|---|---|
| 808,285 | Haines | Dec. 26, 1905 |
| 1,073,199 | Wilt | Sept. 16, 1913 |
| 1,518,199 | Hennings | Dec. 9, 1924 |
| 1,535,957 | Stanley et al. | Apr. 28, 1925 |
| 1,586,178 | Comstock | May 25, 1926 |
| 1,653,400 | Jeffries | Dec. 20, 1927 |
| 2,001,241 | De Vries | May 14, 1935 |
| 2,246,413 | Haselwood | June 17, 1941 |
| 2,258,080 | Thomas et al. | Oct. 7, 1941 |
| 2,523,949 | Gambill | Sept. 26, 1950 |
| 2,618,096 | Wagner | Nov. 18, 1952 |